July 17, 1934.    LE ROY PAYNE ET AL    1,966,680
RAISIN TREATMENT APPARATUS AND METHOD
Filed Dec. 1, 1930
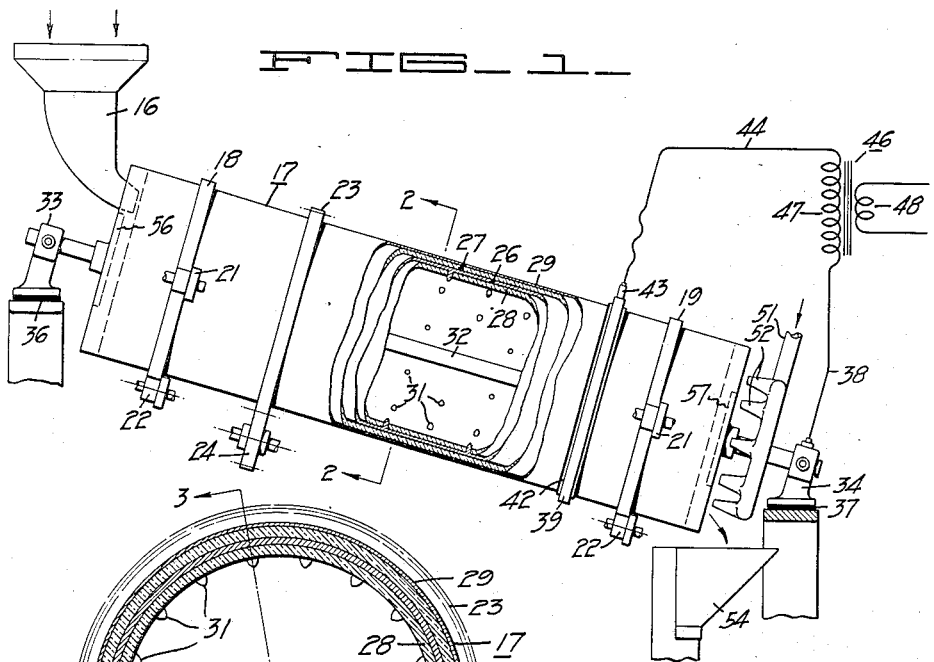
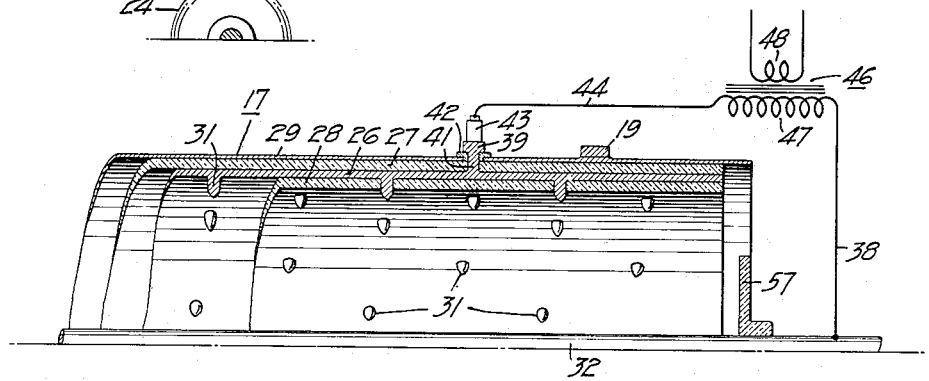
INVENTORS
LEROY PAYNE
THOMAS W. W. FORREST
BY
White, Prost, Fleher Lothrop
ATTORNEYS.

Patented July 17, 1934

1,966,680

UNITED STATES PATENT OFFICE 1,966,680

RAISIN TREATMENT APPARATUS AND METHOD

Le Roy Payne, San Francisco, and Thomas W. W. Forrest, Fresno, Calif.

Application December 1, 1930, Serial No. 499,188

4 Claims. (Cl. 146—55)

This invention relates to a method of and apparatus for treating raisins and similar fruit and is particularly adapted for removing the stems from products of this class.

Heretofore, it has been a common practice in removing stems from raisins to utilize mechanical agitators. Frequently, the agitation necessary is so violent that the skin of the fruit is ruptured, thereby rendering the fruit more perishable. Also, the agitating method requires that the fruit be in a highly dried condition in order that the stems be brittle enough to be shaken from the fruit. Drying or dehydrating the fruit to this extent is disadvantageous for several reasons. Frequently the fruit must be dried beyond the extent desired in the finished product and it becomes necessary to replace part of the moisture which has been removed, thus making the process slow and relatively expensive. Artificial means is commonly resorted to in dehydrating the fruit and this step usually requires that the fruit be subjected to prolonged heat treatment at relatively high temperatures. Such prolonged heat treatment sometimes impairs the flavor and edible qualities of the fruit, due to caramelizing part of the sugar content of the fruit.

It is one object of this invention to provide a method of removing stems from fruit of this class which obviates the necessity of dehydrating the fruit beyond the degree desired in the finished product.

A further object is to devise a method of removing stems which is faster and more convenient than former methods, and which will not injure the product.

A still further object is to provide apparatus for carrying out the method of this invention.

Other objects and advantages will become apparent to those skilled in the art as the detailed description of one embodiment of this invention proceeds.

Attention is directed to the accompanying drawing in which:

Fig. 1 illustrates a preferred form of apparatus embodying the principles of this invention.

Fig. 2 is a cross section taken on line 2—2 of Fig. 1.

Fig. 3 is a cross section taken on line 3—3 of Fig. 2.

Briefly, the method of this invention comprises conveying raisins or similar fruit into a suitable chamber and causing discharges of high potential electric current to ignite the stems of the raisins without, however, causing injury to the body portion of the raisins.

Referring to the drawing a hopper 16 is shown for delivering raisins into a chamber formed, for example, by a rotatable cylindrical structure 17. For rotatably mounting cylinder 17 it is provided with a plurality of roller guides 18, 19 each of which is adapted to cooperate with a plurality of flanged rollers 21, 22. An annular gear 23 encircles cylinder 17 and meshes with a driving gear 24. Preferably, cylinder 17 is rotated at a rate which is sufficient to carry the raisins to a point near its upper portion where they are allowed to drop across to the bottom portion of the cylinder. Thus, the rate of rotation is not great enough to cause the raisins to be retained against the cylinder walls by centrifugal force for a complete revolution. In this manner the raisins are caused to shower transversely across cylinder 17 as the cylinder rotates. Cylinder 17 is inclined from the horizontal so that when the raisins are introduced into the upper portion of the cylinder they continually progress toward the lower or discharge end.

Cylindrical structure 17 in practice can be formed of an electrically conducting cylinder 26 insulated on both sides by insulating material 27 and 28 and has an outer casing 29, which can be composed of sheet metal. A relatively large number of inwardly extending conducting projections or electrodes 31 extend from cylinder 26 through the insulating material 28.

A relatively stationary conducting shaft 32 mounted on brackets 33 and 34 extends longitudinally through the central part of cylinder 17. Bracket 33 is preferably insulated from its support, as by means of insulation 36, and bracket 34 can be provided with similar insulation 37. Shaft 32 is connected by an electrical conductor 38 to one side of a source of high potential electric current, the other side of which is adapted to be connected to the conducting cylinder 26. To facilitate making electrical connections with cylinder 26, a slip ring 39 can be provided which is connected by a conducting member 41 with cylinder 26. If desired, slip ring 39 can be insulated in any suitable manner from casing 29 of cylinder 17 as by means of an insulating member 42. A brush 43 making contact with slip ring 39 is connected by a conductor 44 to the other side of the source of current. A step-up transformer 46 having a secondary winding 47 and a primary winding 48 can be employed for providing a relatively high potential current. Primary winding 48 is adapted to be connected to any suitable source of current and secondary winding 47 is connected to the apparatus through a circuit which extends from winding 47 through conductor 44, brush 43, slip ring 39, cylinder 26, electrodes 31, through a plurality of air gaps in parallel to conducting shaft 32, through conductor 38 and back to winding 47.

Preferably, the current in this circuit has a potential which is sufficiently high to discharge momentarily through the air gaps when raisins are interposed in the gaps, but is insufficient to sustain a continuous arc. As the raisins are showering down over and around shaft 32, the effective length of a number of the gaps is decreased by an amount which is sufficient to enable discharge of the current through the gaps with the raisins interposed therein and the stems of the raisins become ignited by such a discharge. It has been found that when gaps of approximately 5 inches are employed and a current having a potential in the neighborhood of 165,000 volts is utilized, the effect of the momentary discharges is sufficient to ignite the stems without, however, raising the temperature of the body portion of the raisins above 100 or 120 degrees Fahrenheit.

Thus, the stems of the raisins are ignited and caused to burn away without injury to the other parts of the raisins. A constant air supply is delivered through the cylinder as by means of a pipe 51 having nozzles 52 directed into the cylinder. This air supply serves to maintain a combustion supporting atmosphere inside of the cylinder and also serves to blow away through the other end of the cylinder the products of combustion. A suitable hopper 54 can be provided at the lower end of the cylinder for receiving raisins after they have passed through the cylinder.

It has been found that under some conditions it is advantageous to wet the raisins to increase the electrical conductivity of the stems before subjecting them to this treatment. Wetting the raisins also serves to protect the body portion of the raisins from the heat developed.

Discs 56 and 57 of insulating material can be mounted on shaft 32 near each end of cylinder 17 to confine the electrical discharges to the interior part of the cylinder.

While we have shown and described a preferred embodiment of our invention we do not wish to be limited thereto, since the invention as defined in the appended claims can be embodied in a plurality of forms.

We claim:

1. Apparatus for removing stems from raisins comprising a cylindrical structure, a plurality of electrodes extending inwardly from the periphery of said cylindrical structure, and a conductor passing longitudinally through said cylindrical structure, said electrodes and said conductor being connected to opposite sides of a source of current.

2. Apparatus for removing stems from raisins comprising a rotatable cylinder, an electrode extending inwardly from the periphery of said cylinder, a conductor passing longitudinally through said cylinder and a source of electric current connected to said electrode and said conductor.

3. Apparatus for removing stems from raisins comprising a hollow cylinder, means for rotating said cylinder, an electrical conductor disposed longitudinally through the cylinder, electrodes mounted about the interior surface of said cylinder, means for delivering raisins into said cylinder and a source of current connected to said electrodes and said conductor.

4. Apparatus for removing stems from raisins comprising a hollow cylinder having its one end adapted to receive raisins to be treated and having its other end adapted to discharge treated raisins, means for rotating said cylinder whereby the raisins caused to pass through the same are maintained in a continual state of agitation, and means including electrodes disposed within said cylinder for subjecting the raisins while so agitated to an electrical discharge.

LE ROY PAYNE.
THOMAS W. W. FORREST.